United States Patent
Sishtla

(10) Patent No.: US 12,163,711 B2
(45) Date of Patent: Dec. 10, 2024

(54) SURGE PREVENTION IN A CHILLER WITH CENTRIFUGAL COMPRESSOR

(71) Applicant: Carrier Corporation, Palm Beach Gardens, FL (US)

(72) Inventor: Vishnu Sishtla, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 183 days.

(21) Appl. No.: 17/358,968

(22) Filed: Jun. 25, 2021

(65) Prior Publication Data

US 2022/0412626 A1 Dec. 29, 2022

(51) Int. Cl.
| | |
|---|---|
| *F25B 49/02* | (2006.01) |
| *F04D 27/00* | (2006.01) |
| *F04D 27/02* | (2006.01) |
| *F25B 1/053* | (2006.01) |
| *F25B 39/04* | (2006.01) |

(52) U.S. Cl.
CPC .......... *F25B 49/022* (2013.01); *F04D 27/001* (2013.01); *F04D 27/02* (2013.01); *F04D 27/0276* (2013.01); *F25B 1/053* (2013.01); *F25B 39/04* (2013.01); *F25B 49/027* (2013.01); *F25B 49/02* (2013.01); *F25B 2339/047* (2013.01); *F25B 2500/12* (2013.01); *F25B 2500/13* (2013.01); *F25B 2600/0253* (2013.01); *F25B 2600/111* (2013.01); *F25B 2600/13* (2013.01)

(58) Field of Classification Search
CPC .... F04D 27/001; F04D 27/02; F04D 27/0276; F25B 49/027; F25B 2339/047; F25B 2600/111; F25B 2600/13
See application file for complete search history.

(56) References Cited

U.S. PATENT DOCUMENTS

| | | | |
|---|---|---|---|
| 4,493,608 A | 1/1985 | Paul | |
| 4,608,833 A | 9/1986 | Kountz | |
| 5,203,179 A | 4/1993 | Powell | |
| 5,355,691 A | 10/1994 | Sullivan et al. | |
| 5,396,779 A | 3/1995 | Voss | |
| 5,873,257 A | 2/1999 | Peterson | |

(Continued)

FOREIGN PATENT DOCUMENTS

| | | |
|---|---|---|
| CN | 104334888 B | 3/2016 |
| CN | 104533820 B | 1/2017 |

(Continued)

OTHER PUBLICATIONS

Extended European Search Report for European Application No. 22180730.8; Report Mail Date Nov. 14, 2022 (pp. 1-7).

*Primary Examiner* — Jonathan Bradford
(74) *Attorney, Agent, or Firm* — CANTOR COLBURN LLP

(57) ABSTRACT

A method of operating a chiller system includes receiving an input from at least one sensor associated with a compressor of the chiller system, determining that the compressor is experiencing a surge or rotating stall event, adjusting at least one operating parameter associated with a heat rejection heat exchanger of the chiller system in response to determining that the compressor is experiencing the surge or rotating stall event, and reducing a condenser saturation temperature by adjusting the at least one operating parameter.

20 Claims, 3 Drawing Sheets

(56) References Cited

U.S. PATENT DOCUMENTS

| | | | |
|---|---|---|---|
| 6,036,432 A | 3/2000 | Sishtla et al. | |
| 6,604,911 B2 | 8/2003 | Pauwels | |
| 7,069,734 B2 | 7/2006 | Knopp | |
| 8,185,247 B2 | 5/2012 | Chao et al. | |
| 9,097,447 B2 | 8/2015 | Trawicki | |
| 9,976,565 B2 | 5/2018 | Sishtla | |
| 10,082,148 B2 | 9/2018 | Lee et al. | |
| 10,184,482 B2 | 1/2019 | Arnou | |
| 10,539,353 B2 | 1/2020 | Umeda et al. | |
| 10,612,827 B2 | 4/2020 | Sibik | |
| 2012/0117989 A1 | 5/2012 | Turney et al. | |
| 2015/0219110 A1* | 8/2015 | De | F04D 27/0292 415/48 |
| 2015/0345849 A1* | 12/2015 | Sullivan | F25B 49/022 62/175 |
| 2015/0362237 A1 | 12/2015 | Clanin et al. | |
| 2021/0063057 A1 | 3/2021 | Vause et al. | |

FOREIGN PATENT DOCUMENTS

| | | |
|---|---|---|
| CN | 106288092 A | 1/2017 |
| CN | 105026855 B | 3/2017 |
| CN | 103867446 B | 5/2017 |
| CN | 104567054 B | 5/2017 |
| CN | 105074360 B | 12/2017 |
| CN | 110056530 B | 11/2020 |
| CN | 107829969 B | 12/2020 |
| CN | 108826775 B | 1/2021 |
| CN | 112303745 A | 2/2021 |
| EP | 3348932 A1 | 7/2018 |

\* cited by examiner

SURGE PREVENTION IN A CHILLER WITH CENTRIFUGAL COMPRESSOR

BACKGROUND

Exemplary embodiments of the present disclosure relate to the art of compressors, and more particularly, to a system and method for controlling surge of a compressor.

Large chiller refrigeration systems commonly use centrifugal compressors. Under partial load conditions, compressor operation is limited by an instability known as surge in which the refrigerant alternately surges backward and forward through the compressor. This alternating flow of refrigerant within the compressor is accompanied by noise, vibration and heat. Another instability that occurs in centrifugal compressors is stall, which may occur near, but at lighter loading than the true surge envelope. This stall involves the formation of rotating stall pockets or cells in the diffuser. Rotating stall is essentially two dimensional instability in which regions of reduced or reversed mass flow rotate around the compressor annulus.

Existing systems typically mitigate or prevent surge/rotating stall by including one or more bypass conduits that route a portion of the refrigerant around at least a portion of the compressor. Additionally, the operation of the compressor motor speed may be adjusted to control the pressure ratio within the compressor. While these methods are suitable, it is desirable to provide alternative methods of controlling a chiller system to prevent a surge or stall event.

BRIEF DESCRIPTION

According to an embodiment, a method of operating a chiller system includes receiving an input from at least one sensor associated with a compressor of the chiller system, determining that the compressor is experiencing a surge or rotating stall event, adjusting at least one operating parameter associated with a heat rejection heat exchanger of the chiller system in response to determining that the compressor is experiencing the surge or rotating stall event, and reducing a condenser saturation temperature by adjusting the at least one operating parameter.

In addition to one or more of the features described above, or as an alternative to any of the foregoing embodiments adjusting at least one operating parameter associated with the heat rejection heat exchanger of the chiller system includes increasing a rotational speed of a fan configured to move a fluid across the heat rejection heat exchanger.

In addition to one or more of the features described above, or as an alternative to any of the foregoing embodiments adjusting at least one operating parameter associated with the heat rejection heat exchanger of the chiller system includes increasing a flow rate of a cooling fluid provided to the heat rejection heat exchanger.

In addition to one or more of the features described above, or as an alternative to any of the foregoing embodiments increasing the flow rate of the cooling fluid provided to the heat rejection heat exchanger further comprises increasing a speed of a pump operable to circulate the cooling fluid between a cooling tower and the heat rejection heat exchanger.

In addition to one or more of the features described above, or as an alternative to any of the foregoing embodiments adjusting at least one operating parameter associated with the heat rejection heat exchanger includes decreasing a temperature of a cooling fluid provided to the heat rejection heat exchanger.

In addition to one or more of the features described above, or as an alternative to any of the foregoing embodiments decreasing the temperature of the cooling fluid provided to the heat rejection heat exchanger further comprises increasing a rotational speed of a fan associated with an air-flow operable to remove heat from the cooling fluid.

In addition to one or more of the features described above, or as an alternative to any of the foregoing embodiments adjusting at least one operating parameter associated with the heat rejection heat exchanger of the chiller system in response to determining that the compressor is experiencing the surge or rotating stall event comprises transforming the at least one operating parameter from a normal condition to a surge condition, and the method further comprises: receiving another input from the at least one sensor associated with the compressor of the chiller system, determining that the compressor is not experiencing the surge or rotating stall event, and transforming the at least one operating parameter from the surge condition to the normal condition.

In addition to one or more of the features described above, or as an alternative to any of the foregoing embodiments adjusting the at least one operating parameter associated with the heat rejection heat exchanger is performed by a controller locally positioned at the chiller system.

In addition to one or more of the features described above, or as an alternative to any of the foregoing embodiments the chiller system is operable to condition a building, and determining that the compressor is experiencing the surge or rotating stall event is performed by another controller of a building management system associated with the building, the another controller of the building management system being operably coupled to the controller locally positioned at the chiller system.

In addition to one or more of the features described above, or as an alternative to any of the foregoing embodiments the compressor is a centrifugal compressor.

In addition to one or more of the features described above, or as an alternative to any of the foregoing embodiments the chiller system is an air-cooled chiller system.

In addition to one or more of the features described above, or as an alternative to any of the foregoing embodiments the chiller system is a water-cooled chiller system.

According to an embodiment, a vapor compression system includes a compressor, a heat rejection heat exchanger, an expansion device, and a heat absorption heat exchanger operably coupled to form a closed fluid loop. At least one sensor is associated with the compressor and at least one controller is operably coupled to the at least one sensor. The at least one controller is configured to determine, via the at least one sensor, if the compressor is experiencing a surge or rotating stall event and adjust at least one operating parameter associated with the heat rejection heat exchanger to reduce a condenser saturation temperature in response to determining that the compressor is experiencing a surge or rotating stall event.

In addition to one or more of the features described above, or as an alternative to any of the foregoing embodiments the at least one operating parameter includes a flow rate of a cooling fluid provided to the heat rejection heat exchanger.

In addition to one or more of the features described above, or as an alternative to any of the foregoing embodiments comprising a fan operable to move a fluid across the heat rejection heat exchanger, wherein the at least one operating parameter is a rotational speed of the fan.

In addition to one or more of the features described above, or as an alternative to any of the foregoing embodiments comprising a cooling tower containing a cooling fluid, the cooling tower being arranged in fluid communication with the heat rejection heat exchanger and a fan operable to move another fluid across the cooling tower to remove heat from the cooling fluid, wherein the at least one operating parameter is a rotational speed of the fan.

In addition to one or more of the features described above, or as an alternative to any of the foregoing embodiments the heat rejection heat exchanger is a gas-cooled heat exchanger.

In addition to one or more of the features described above, or as an alternative to any of the foregoing embodiments the heat rejection heat exchanger is a water-cooled heat exchanger.

In addition to one or more of the features described above, or as an alternative to any of the foregoing embodiments the at least one controller includes a controller positioned locally at the vapor compression system.

In addition to one or more of the features described above, or as an alternative to any of the foregoing embodiments the vapor compression system is operable to condition a building having a building management system, and the at least one controller includes a controller of the building management system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
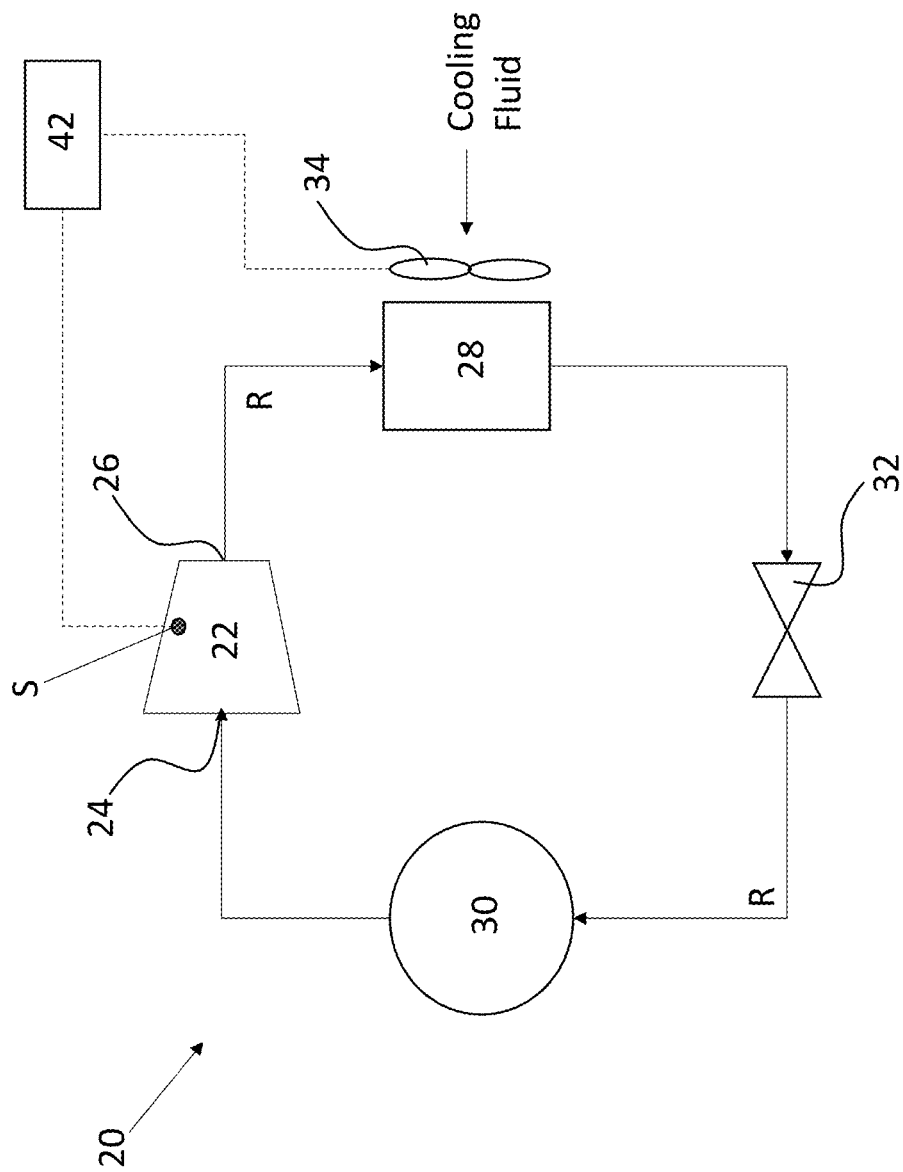
FIG. 1 is a schematic diagram of an air-cooled chiller system according to an embodiment.

With reference now to FIG. 1, an example of a vapor compression system 20, and more particularly a chiller system, having a closed fluid loop within which a refrigerant R or other fluid circulates is provided. As shown, the vapor compression system 20 includes a compressor 22 having a suction port (inlet) 24 and a discharge port (outlet) 26. The vapor compression system 20 further includes a first, heat rejection heat exchanger 28, for example a condenser. The vapor compression system 20 additionally includes a second, heat absorption heat exchanger 30, for example an evaporator, located downstream from the heat rejection heat exchanger 28. Further, an expansion device 32 is located along the fluid flow path downstream of the compressor 22 and upstream of the evaporator heat absorption heat exchanger. As shown, the expansion device 32 may be located at a position along the fluid loop between the heat rejection heat exchanger 28 and the heat absorption heat exchanger 30.

In the illustrated-non-limiting embodiment, the heat rejection heat exchanger 28 is a gas-cooled heat exchanger such that the refrigerant within the heat exchanger is cooled by a flow of an external flow of gas, such as air for example. Accordingly, the vapor compression system of FIG. 1 may be referred to herein as a gas-cooled chiller or an air-cooled chiller. The gas may be pushed or drawn moved across the heat rejection heat exchanger 28 by a fan 34 or other movement device.

Figure 2:
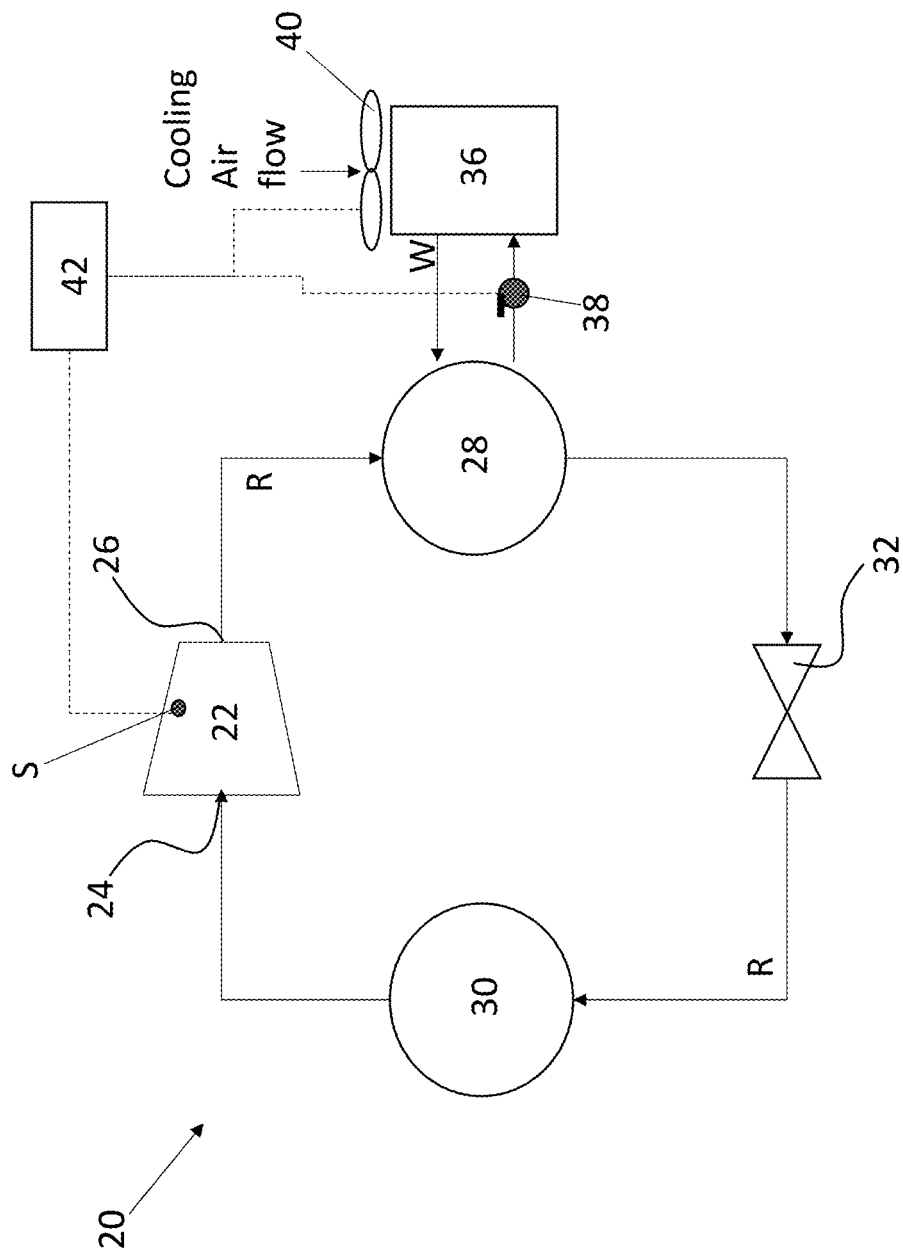
FIG. 2 is a schematic diagram of a water-cooled chiller system according to an embodiment.

Another example of a chiller system 20 is illustrated in FIG. 2. The components within the system of FIG. 2, such as the compressor 22, expansion device 32, and heat absorption heat exchanger 30, are identical to those described with respect to FIG. 1. However, in the non-limiting embodiment of FIG. 2, the heat rejection heat exchanger 28 is a refrigerant-water heat exchanger where the refrigerant is cooled by an external flow of water. Accordingly, the vapor compression system of FIG. 2 may be referred to herein as a water-cooled chiller. The flow of water may be delivered from a source 36, such as a cooling tower for example, located directly adjacent to the heat rejection heat exchanger 28, or alternatively, located remotely from a heat rejection heat exchanger 28, such as at a different location within a building being conditioned by the vapor compression system 20 for example. As shown, a pump 38 may be used to circulate a flow of cool water from the cooling tower 36 to the heat rejection heat exchanger 28 and also to return a flow of heated water to the cooling tower 36 from the heat rejection heat exchanger 28. Within the cooling tower 36, the water may be cooled via a flow of an external gas driven by a fan 40, such as an air-flow for example, before being returned to the heat rejection heat exchanger 28. It should be understood that the vapor compression systems 20 illustrated and described herein are simplified systems and that a vapor compression system 20 having additional components are also within the scope of the disclosure.

In an embodiment, the compressor 22 used in the above described vapor compression systems 20 is a centrifugal compressor. As is known in the art, centrifugal compressors are susceptible to a form of flow instability referred to as "surge" or "rotating stall." The particular configuration of the compressor 22, the type or refrigerant, and the operating conditions may all influence when surge and rotating stall of the compressor 22 occur. For example, in an air-cooled system, the compressor 22 is more susceptible to surge when the outside air temperature increases. Similarly, the compressor 22 is more prone to surge as the condenser saturation temperature increases.

Figure 3:
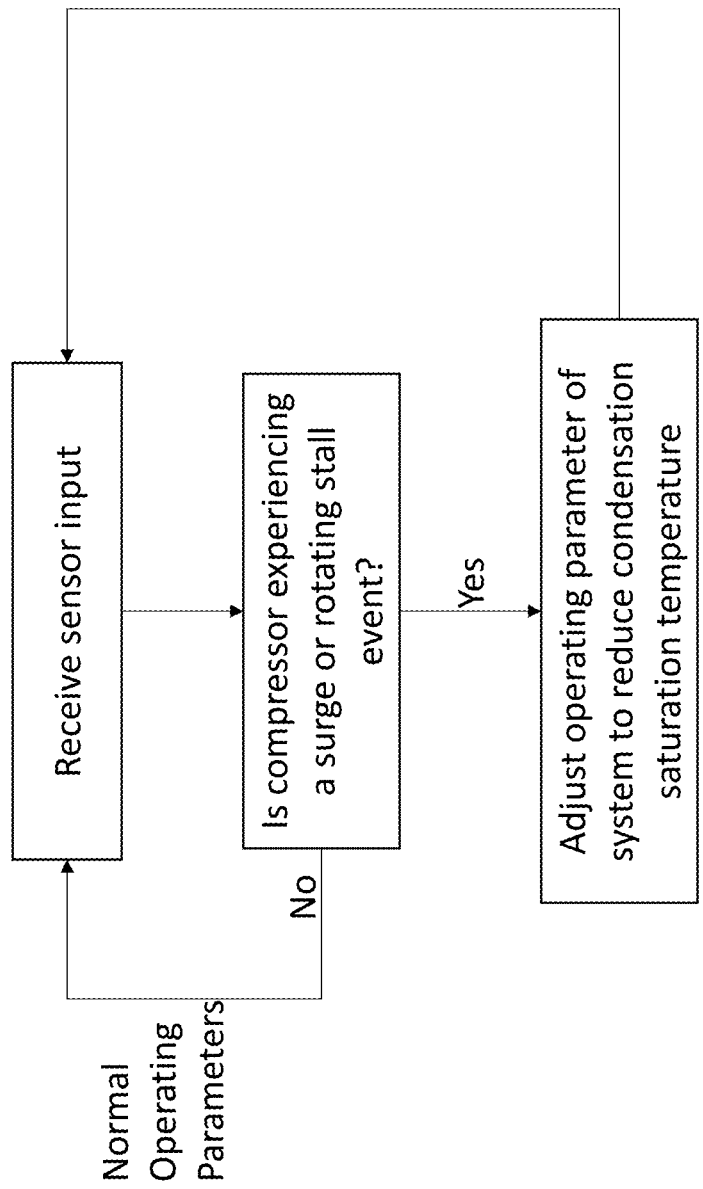
FIG. 3 is a flow chart of a method of operating a chiller system according to an embodiment.

As shown, a monitoring system is configured to monitor operation of the compressor 22 and/or the vapor compression system 20. The monitoring system may include one or more sensors S associated with the compressor 22 and at least one controller, illustrated schematically at 42, operably coupled to the sensors S. With continued reference to FIGS. 1 and 2, and further reference to FIG. 3, a method of operating the vapor compression system 20 is illustrated. As shown, a processor of the at least one controller 42 is configured to analyze the information or inputs provided by the at least one sensor(s) S to determine if the compressor 22 is experiencing a surge or rotating stall event. As used herein the phrase "experiencing a surge or rotating stall event" is also intended to include embodiments where a surge or rotating stall event is about to occur. Further, in response to said determination, the controller 42 may be configured to initiate at least one corrective action to prevent and/or to counter the compressor surge or rotating stall event. The at least one corrective action includes adjusting or transforming at least one operating parameter of the vapor compression system 20 from a first, normal condition to a second, surge condition. In an embodiment, the at least one corrective action initiated by the controller 42 is intended to reduce the saturation temperature of the refrigerant at the heat rejection heat exchanger 28 (also referred to herein as "condenser saturation temperature") and therefore the associated pressure difference across the compressor 22.

The controller may be localized to the vapor compression system 20, or alternatively, may be integrated into a building that is being conditioned by the vapor compression system 20, for example as part of the building management system. In an embodiment, the vapor compression system 20 includes a locally positioned controller 42 that is operably coupled to a controller of the building management system. In such embodiments, the processing of the sensor data to determine if the compressor 22 is experiencing a surge or rotating stall event and the selection of what corrective actions to take may be performed by the building controller and communicated to the controller 42 of the vapor compression system 20 for implementation. However, it should be understood that embodiments where some or all of the processing of the sensor signals and/or the determination of the corrective actions is performed by the locally positioned controller 42 are also contemplated herein.

In embodiments where the heat rejection heat exchanger 28 is a gas-cooled heat exchanger, as shown in FIG. 1, in response to determining the occurrence of a surge or rotating stall event, the controller 42 may be configured to adjust, for example increase, the rotational speed of the fan 34. Increasing the operational speed of the fan 34 will improve the heat transfer between the refrigerant and the gas at the heat rejection heat exchanger 28. As a result, the overall temperature rise across the heat rejection heat exchanger 28 is reduced, resulting in a reduced condenser saturation temperature.

In embodiments where the heat rejection heat exchanger 28 is a water-cooled heat exchanger, as shown in FIG. 2, the condenser saturation temperature is generally determined by the temperature of the water provided to the heat rejection heat exchanger 28 and the water flow rate. Accordingly, the controller 42 may be configured to increase the water flow rate between the cooling tower 36 and the heat rejection heat exchanger 28, such as via the pump 38 for example. Alternatively, or in addition, the controller 42 may be configured to reduce the temperature of the fluid used to cool the refrigerant within the heat rejection heat exchanger 28. For example, to cool the water provided to the heat rejection heat exchanger 28 from the cooling tower 36, the controller 42 may increase the rotational speed of the fan 40 associated with the cooling tower 36. Increasing the speed of the fan 40 will increase the amount of heat that is removed from the water within the cooling tower 36 before it is provided to the heat rejection heat exchanger 28. It should be understood that embodiments where the controller is similarly operable to reduce a temperature of the gas or air provided to the heat rejection heat exchanger 28 or an air-cooled chiller are also contemplated herein. Increasing the flow rate and reducing the temperature of the fluid provided to the heat rejection heat exchanger 28 both reduce the condensing saturation temperature, resulting in a lower pressure ratio at the compressor.

Once a surge or rotating stall event is no longer detected by the controller 42, the controller may return the system to normal operation. For example, the one or more operating parameters that were transformed to a second condition by the controller 42 to counteract the surge or rotating stall condition, such as the fan speed or the fluid temperature for example, may be returned to a first operating parameter associated with normal operation of the compressor 22.

In an embodiment, the controller 42 may determine what corrective actions to implement based on how close the compressor 22 is to the threshold associated with a surge or rotating stall condition. For example, in embodiments where the temperature at the compressor 22 exceeds the threshold temperature associated with a surge or rotating stall condition by less than 2° F., or even less than 1° F., the controller 42 may not adjust the condenser saturation temperature. However, in embodiments where the temperature of the compressor 22 exceeds the threshold temperature associated with a surge or rotating stall condition by up to 2° F., but the motor associated with the compressor 22 is operating at 100% speed, the controller 42 may reduce the condenser saturation temperature, such as by increasing the fluid flow rate through the heat rejection heat exchanger 28 or the fan speed as previously described. Similarly, in embodiments where the controller 42 determines that the temperature of the compressor 22 is less than the temperature associated with a surge or rotating stall by at least 1° F., and in some embodiments by at least 2° F., the controller 42 may decrease at least one of the flow rate through the heat rejection heat exchanger 28 and the fan speed if doing so will improve the operational efficiency of the system 20.

By automatically adjusting an operating parameter associated with the heat rejection heat exchanger upon detecting that the compressor is experiencing or about to experience a surge or rotating stall event, the chiller system provides improved cooling and reliability without requiring the added complexity of a bypass circuit.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a chiller system comprising:
    receiving an input from at least one sensor associated with a compressor of the chiller system, wherein the input is representative of a condenser saturation temperature;
    determining that the compressor is experiencing a surge or rotating stall event by comparing the condenser saturation temperature to a condenser saturation temperature threshold;
    adjusting at least one operating parameter associated with a heat rejection heat exchanger of the chiller system in response to determining that the compressor is experiencing the surge or rotating stall event; and reducing a condenser saturation temperature by adjusting the at least one operating parameter.

2. The method of claim 1, wherein adjusting at least one operating parameter associated with the heat rejection heat exchanger of the chiller system includes increasing a rotational speed of a fan configured to move a fluid across the heat rejection heat exchanger.

3. The method of claim 1, wherein adjusting at least one operating parameter associated with the heat rejection heat exchanger of the chiller system includes increasing a flow rate of a cooling fluid provided to the heat rejection heat exchanger.

4. The method of claim 3, wherein increasing the flow rate of the cooling fluid provided to the heat rejection heat exchanger further comprises increasing a speed of a pump operable to circulate the cooling fluid between a cooling tower and the heat rejection heat exchanger.

5. The method of claim 1, wherein adjusting at least one operating parameter associated with the heat rejection heat exchanger includes decreasing a temperature of a cooling fluid provided to the heat rejection heat exchanger.

6. The method of claim 5, wherein decreasing the temperature of the cooling fluid provided to the heat rejection heat exchanger further comprises increasing a rotational speed of a fan associated with an air-flow operable to remove heat from the cooling fluid.

7. The method of claim 1, wherein adjusting at least one operating parameter associated with the heat rejection heat exchanger of the chiller system in response to determining that the compressor is experiencing the surge or rotating stall event comprises transforming the at least one operating parameter from a normal condition to a surge condition, and the method further comprises:

receiving another input from the at least one sensor associated with the compressor of the chiller system;

determining that the compressor is not experiencing the surge or rotating stall event; and transforming the at least one operating parameter from the surge condition to the normal condition.

8. The method of claim 1, wherein adjusting the at least one operating parameter associated with the heat rejection heat exchanger is performed by a controller locally positioned at the chiller system.

9. The method of claim 8, wherein the chiller system is operable to condition a building, and determining that the compressor is experiencing the surge or rotating stall event is performed by another controller of a building management system associated with the building, the another controller of the building management system being operably coupled to the controller locally positioned at the chiller system.

10. The method of claim 1, wherein the compressor is a centrifugal compressor.

11. The method of claim 1, wherein the chiller system is an air-cooled chiller system.

12. The method of claim 1, wherein the chiller system is a water-cooled chiller system.

13. A vapor compression system comprising:

a compressor, a heat rejection heat exchanger, an expansion device, and a heat absorption heat exchanger operably coupled to form a closed fluid loop;

at least one sensor associated with the compressor; and at least one controller operably coupled to the at least one sensor, wherein the at least one controller is configured to:

determine, using a condenser saturation temperature associated with the the at least one sensor, if the compressor is experiencing a surge or rotating stall event by comparing the condenser saturation temperature to a condenser saturation temperature threshold; and adjust at least one operating parameter associated with the heat rejection heat exchanger to reduce a condenser saturation temperature in response to determining that the compressor is experiencing a surge or rotating stall event.

14. The vapor compression system of claim 13, wherein the at least one operating parameter includes a flow rate of a cooling fluid provided to the heat rejection heat exchanger.

15. The vapor compression system of claim 13, further comprising a fan operable to move a fluid across the heat rejection heat exchanger, wherein the at least one operating parameter is a rotational speed of the fan.

16. The vapor compression system of claim 13, further comprising a cooling tower containing a cooling fluid, the cooling tower being arranged in fluid communication with the heat rejection heat exchanger and a fan operable to move another fluid across the cooling tower to remove heat from the cooling fluid, wherein the at least one operating parameter is a rotational speed of the fan.

17. The vapor compression system of claim 13, wherein the heat rejection heat exchanger is a gas-cooled heat exchanger.

18. The vapor compression system of claim 13, wherein the heat rejection heat exchanger is a water-cooled heat exchanger.

19. The vapor compression system of claim 13, wherein the at least one controller includes a controller positioned locally at the vapor compression system.

20. The vapor compression system of claim 13, wherein the vapor compression system is operable to condition a building having a building management system, and the at least one controller includes a controller of the building management system.

* * * * *